United States Patent

[11] 3,568,573

| [72] | Inventors | John M. Bailey |
| | | Dunlap; |
| | | Michael K. Stratton, Peoria, Ill. |
| [21] | Appl. No. | 836,513 |
| [22] | Filed | June 25, 1969 |
| [45] | Patented | Mar. 9, 1971 |
| [73] | Assignee | Caterpillar Tractor Co. |
| | | Peoria, Ill. |

[54] CYLINDER LINER SUPPORT
3 Claims, 7 Drawing Figs.

[52] U.S. Cl. ............................................. 92/171, 123/41.84
[51] Int. Cl. ............................................. F01j 11/04
[50] Field of Search ................................. 123/193 (C,H,CH), 41.83, 41.84; 92/169—171

[56] References Cited
UNITED STATES PATENTS

| 1,643,645 | 9/1927 | Strand | 92/171X |
| 2,127,825 | 8/1938 | Mader | 123/193CH |
| 3,315,651 | 4/1967 | Dangauthier | 92/171X |
| 2,198,301 | 4/1940 | Campbell | 92/171 |
| 2,784,040 | 3/1957 | Head | 92/171 |
| 3,436,085 | 4/1969 | Polk | 92/169X |

FOREIGN PATENTS

| 406,000 | 2/1934 | Great Britain | 123/41.84 |

Primary Examiner—Martin P. Schwadron
Assistant Examiner—Allen M. Ostrager
Attorney—Fryer, Tjensvold, Feix, Phillips & Lempio ABSTRACT: A cylinder liner support utilizing a yieldable or selectively fitted spacer for the liner seat, and a conformable seal ring as the combustion seal.

Patented March 9, 1971

INVENTORS
JOHN M. BAILEY
MICHAEL K. STRATTON

BY
Fryer, Tjensvold, Feix, Phillips & Lempio
ATTORNEYS

INVENTORS
JOHN M. BAILEY
MICHAEL K. STRATTON

ATTORNEYS

CYLINDER LINER SUPPORT

BACKGROUND AND SUMMARY OF THE INVENTION

Engine blocks utilizing cylinder liners are usually provided with counterbores in the top deck of the block, in which the flanges of the cylinder liners are seated. In many applications, the upper face of each cylinder liner flange projects slightly above the top deck of the block to enable a gasket to be compressed between the cylinder head and the liner flange to provide a seal for combustion gases. In engines having a plurality of cylinder liners, machining tolerances of the counterbores and liner flanges result in some liners projecting above the top deck further than others. When this occurs, the bolting of the cylinder head down to the block causes the liners with the greater projection to subject their respective counterbores to greater loads than those liners of lesser projection.

The relatively high bolt torque which is required to insure adequate sealing of the head gasket often results in excess stress in the counterbore and, during engine operation, cyclic and thermal stresses cause cracking of the block counterbores, with an accompanying loss of liner projection and failure of the combustion seal.

In attempting to overcome these problems, some designs have utilized a steel plate which rests upon the top deck of the cylinder block and has a bore and counterbore coaxially situated with each cylinder bore, the cylinder liner flange being supported in the counterbore of the plate. It has been found, however, that engines of this design have continued to crack at the counterbore of the steel plate, despite its greater strength.

In other designs, a spacer deck has been utilized between the block and cylinder head with the cylinder liner resting upon a shim wear plate or directly upon the cylinder block. In these cases, the load acting upon the liner can vary because of the variances in the tolerances of the liner flange. Further, cooling of the top of the cylinder liner is not provided for in these designs.

In the improvements described above, the combustion gas sealing has proven to be unsuccessful as higher cylinder pressures are achieved and have also proven to be relatively expensive.

In one embodiment of the present invention, a conformable seal, positioned in a groove on the top face of the liner, serves as a combustion seal by conforming to the groove and forming a seal against the cylinder head bottom deck as long as the load acting upon the liner maintains the liner in a metal-to-metal contact with the bottom deck. Columns integral with the cylinder block act as seats for the cylinder liners. When the cylinder head is assembled to the block, the liners and columns are compressed axially and act as a stiff spring.

In order to compensate for the excess loads which would be exerted upon the liners projecting furthest from the cylinder block in accordance with liner projection tolerances, a yieldable spacer may be used between the liner shoulder and the column seat, to yield at a predetermined load and maintain a limited and equal load on all the liners regardless of the torque required in tightening the cylinder head to the block.

During engine operation, heat will expand the liner and column axially, causing the spacer to be compressed slightly more. When the engine cools and contraction takes place, the loss of load in the column and liner would allow the liner to lose contact with the cylinder head, except for the fact that the column and liner, having been compressed axially so as to act as a spring, deflect to maintain a pressure against the cylinder head. Thus, the liner and its conformable seal is prevented from losing contact with the head.

In an alternate form, the yieldable spacer could be replaced with a selectively fitted solid spacer. When used with a plurality of liners, spacers would be selected to give equal liner projection above the block, thereby insuring equal head pressure on all liners. As in the previously summarized embodiment, the elastic deflection of each liner and column will insure metal-to-metal contact between the liner flange top and the cylinder head bottom deck.

It has also been found that the configuration of the embodiments to be described in greater detail below eliminate the notch stresses by the removal of the counterbores, eliminate the necessity of providing a flange at the top of the cylinder liner, and produce greatly improved cylinder liner top cooling. This latter feature produces a reduction in the thermal cycling of the combustion seal since the entire top portion of the liner can now be cooled.

As an additional advantage, the insertion of the lower portion of the liner into the bore of the column results in the provision of a thicker cross section of the lower portion of the cylinder, taking the column and liner together, causing the lower section of the cylinder to be damped against vibration. It has been theorized that the vibration of the cylinder in an area in which it is exposed to a swiftly moving flow of coolant results in cavitation within the coolant in that area and further, that the cavitation produces erosion of the cylinder liner on its surface. Therefore, the wall portion of the cylinder which is reduced in thickness would be subject to greater vibration, and therefore greater erosion. In the configuration of this invention, however, the thinner wall portion of the cylinder liner is maintained within the wall of the column so as to produce an effectively uniform cross section, for vibration damping purposes, throughout the length of the cylinder liner.

As a still further advantage of the present invention, the configuration of the various embodiments of this invention will allow the cylinder liners to be placed within the cylinder block in closer proximity than heretofore possible, thereby allowing for a greater cubic displacement in an engine, within a given length.

Other objects and advantages of the present invention will become apparent from the following description and claims as illustrated in the accompanying drawings which, by way of illustration, show a preferred embodiment of the present invention and principles thereof and what is now considered to be the best modes contemplated for applying these principles. It is recognized that other embodiments of the invention utilizing the same or equivalent principles may be used, and structural changes may be made as desired by those skilled in the art, without departing from the present invention and purview of the appended claims.

DETAILED DESCRIPTION

Figure 1:
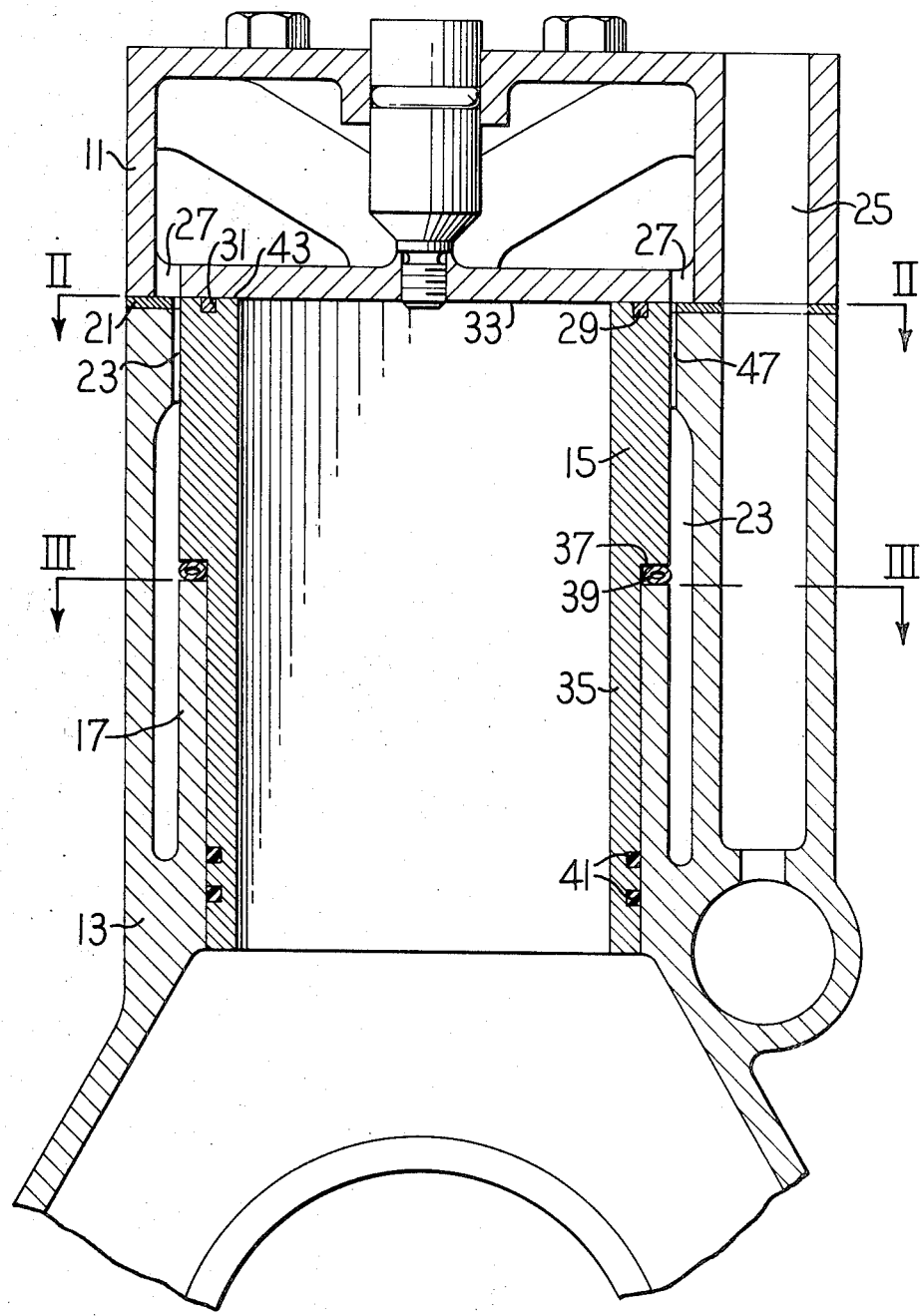
FIG. 1 is a vertical cross-sectional view of an engine cylinder block and cylinder head assembly, incorporating the present invention.
Figure 2:
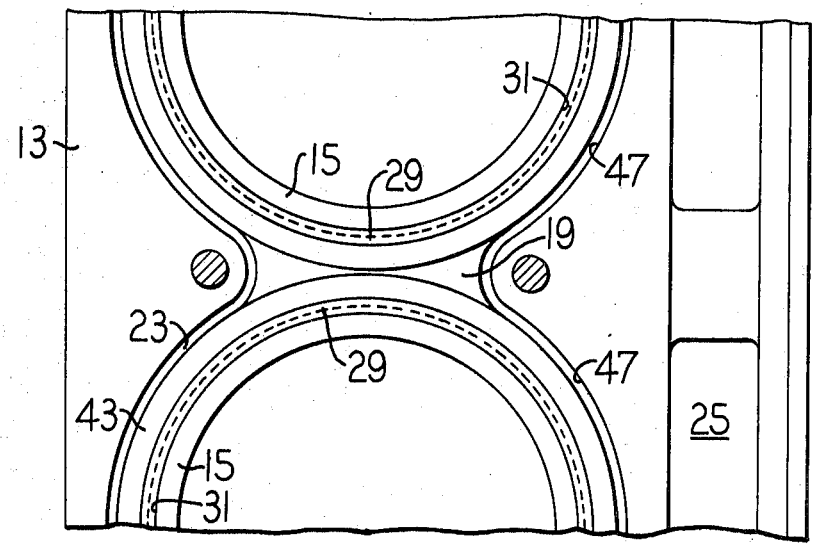
FIG. 2 is a top view of the cylinder block and liner assembly, taken along a line II—II of FIG. 1.
Figure 3:
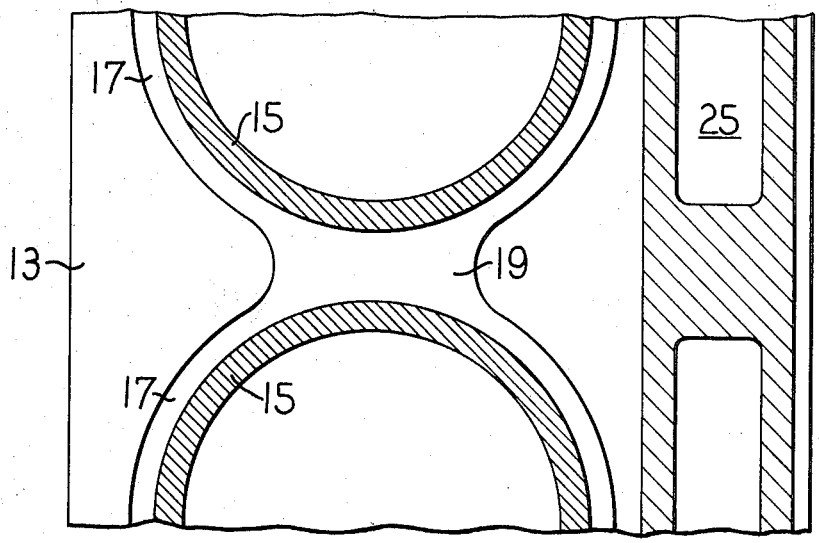
FIG. 3 is a view of the cylinder block and liner assembly taken along a line III—III of FIG. 1.

Referring now to FIGS. 1—3, a cylinder head 11 is mounted on an engine block 13, which supports one or more cylinder liners 15 therein.

More particularly, the cylinder block has a number of columns 17 therein equal to the number of cylinder liners to be supported. The columns 17 may be joined by a web 19 which may be formed so that the top ends of the cylinder liners may be positioned closely adjacent one another as shown in FIG. 2. A gasket 21 is situated between the cylinder block and head so as to seal water passages 23 and oil passages 25 from one another. As can be seen in FIG. 1, coolant passing through the passages 23 enters the head through passages 27, allowing the entire top portion of the cylinder liners to be cooled.

A conformable seal 29, which may be of aluminum or other material, such as Vespel, is mounted within a groove 31 in the top of each cylinder liner so as to abut the lower surface 33 of the bottom deck of the cylinder head.

Each cylinder liner also has a reduced lower section 35 which fits within its respective column 17 and the resultant shoulder section 37 of the cylinder liner is positioned upon a yieldable spacer 39. The lower end of the reduced section 35 may be sealed by O-rings 41 to keep the water in passages 23 and the oil in the crankcase separated.

As the cylinder head 11 is bolted to the block 13 and the bolts are tightened, a load is applied between the upper surfaces 43 of the cylinder liners and the lower surface 33 of the bottom deck of the head. This load causes a compression of the combustion seals 29 until there is metal-to-metal contact between the head and the cylinder liner and each cylinder liner face 43. As the bolts are tightened further, an elastic deflection of the liner 15 and the column 17 takes place and, at a predetermined load, the spacers 39 commence to yield. Further tightening of the head to the block will not place a greater force on the surface 43 of the cylinder head but, instead, will cause the spacers 39 to continue to yield under the increased force. Tightening of the head to the cylinder block also causes the gasket 21 to be compressed so as to fully isolate passages 23 and 27 from passages 25.

When the engine is operating, water flowing through passages 23 cools the upper portion of the cylinder liner and flows through the clearance determined by the outer periphery of the cylinder liner and a bore 47 in the cylinder block, thereafter flowing into the passages 27 in the head.

The heat generated due to the engine operation will cause the cylinder liner 15 and column 17 to expand axially, further deforming spacer 39. However, later cooling of the engine with the resultant contraction of the liner and column does not allow surfaces 33 and 43 to separate since the predetermined yield point of the spacer 39 has created a preload condition on the liner and column which serves to continuously urge the liner against the head, preventing the combustion seal 29 from leaking.

It should be noted that, if desired, the concept of the yieldable spacer could be utilized to support either the lower end of a cylinder liner within a counterbore at the bottom of the cylinder liner bore in the cylinder block, or to support a flange at the top of the cylinder liner within a counterbore at the top of the cylinder block bore. Either of these alternate possibilities could still be utilized with a compressible combustion seal in the top face of the cylinder liner, with at least some degree of preloading of the liner to maintain a combustion seal when the engine is cool.

Figure 4:
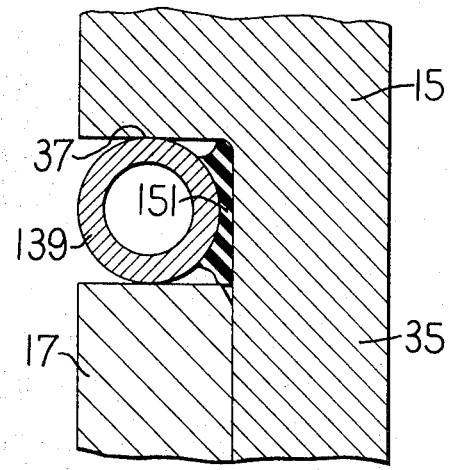
FIGS. 4—7 illustrate various embodiments of the spacer means which may be utilized to properly position the cylinder liner relative to its supporting member.
Figure 5:
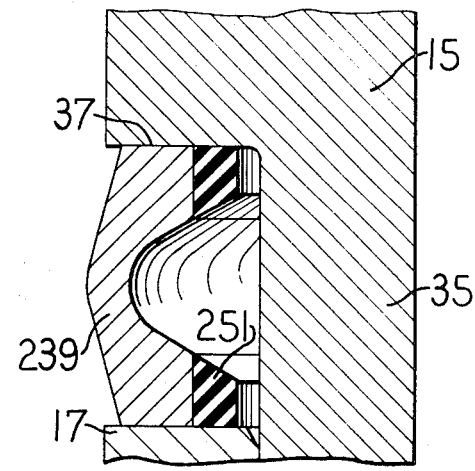
Figure 6:
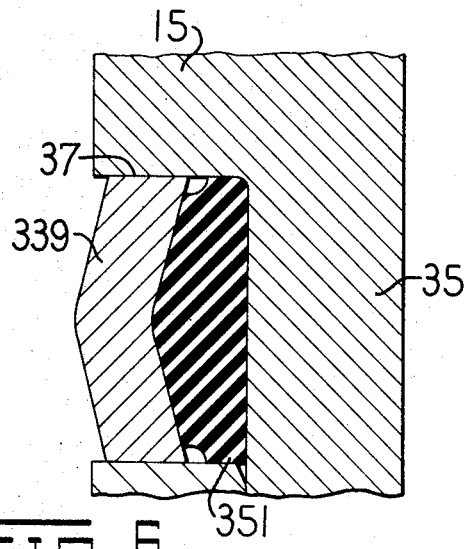

As illustrated in FIG. 1, the yieldable spacer 39 may be formed of simply a hollow O-ring shape. As shown in the yieldable support embodiments illustrated in FIGS. 4—6, however, the yieldable spacers therein illustrated as 139, 239, and 339 may be formed having an elastomer 151, 251, or 351, respectively, molded thereto. With each t of these embodiments, the elastomer will provide a seal between the water passages and the cylinder liner, thereby eliminating the need for O-rings 41 at the lower end of the liner.

Figure 7:
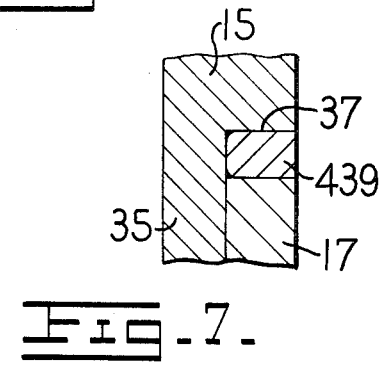

As a further alternative to the spacer means previously described for supporting the cylinder liner 15 relative to the column 17, FIG. 7 illustrates a nonyieldable spacer ring 439 having a thickness which has been selected to correct for dimensional tolerances. Such spacer rings would be individually chosen for thickness in accordance with the actual length of each cylinder liner so as to result in equal projection of all liners above the top portion of the cylinder block.

Use of the nonyieldable spacer ring would still allow the cylinder liner to be preloaded by the tightening of the head to the block, thereby maintaining the combustion seal when the engine is cool.

Thus, the applicants have provided several embodiments of a new and improved concept of cylinder liner support which yield a true advance in the art. Many further modifications and alterations of the invention as thus illustrated will be obvious to those skilled in the art.

We claim:

1. An internal combustion engine having:
a cylinder block having a top deck portion;
a plurality of cylinder bores therein;
a tubular column within and in spaced concentric relation to each bore and extending from a position adjacent one end of the bore to a position intermediate the ends of the bore, thereby at least partially defining coolant passages within the cylinder block;
a generally cylindrical cylinder liner in each cylinder bore;
an end face on each cylinder liner;
a shoulder on each cylinder liner;
each generally cylindrical cylinder liner being dimensioned so as to be in spaced relation to a respective cylinder bore over the length along said liner between said end face and said shoulder;
a cylinder head on the cylinder block having a bottom deck portion contacting both said cylinder liner end faces and said top deck portion;
means for securing said head to said cylinder block, and at the same time imposing a load on said liners; and
yieldable spacer means between each of said tubular columns and a respective shoulder for yieldably supporting said liners so that a limited and at least substantially equal loading is maintained on each one of said liners regardless of the different loading imposed on each liner by said securing means due to dimensional differences between liners.

2. The engine of claim 1 including a sealing material bonded to each yieldable spacer means.

3. The engines of claim 1 including a conformable seal in the end face of each cylinder liner adapted to seal against the cylinder block bottom deck portion.